(12) United States Patent
Usui et al.

(10) Patent No.: US 6,562,484 B2
(45) Date of Patent: May 13, 2003

(54) STEEL MATERIAL OF HIGH FATIGUE STRENGTH AND A PROCESS FOR MANUFACTURING THE SAME

(75) Inventors: Masayoshi Usui, Numazu (JP); Kikuo Asada, Mishima (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/761,901

(22) Filed: Jan. 17, 2001

(65) Prior Publication Data

US 2001/0010241 A1 Aug. 2, 2001

(30) Foreign Application Priority Data

Jan. 26, 2000 (JP) ........................................ 2000-017525

(51) Int. Cl.⁷ .............................................. B32B 15/18
(52) U.S. Cl. ........................ 428/680; 428/684; 148/518; 148/519; 148/530
(58) Field of Search .................................. 148/518, 519, 148/530; 428/680, 684

(56) References Cited

U.S. PATENT DOCUMENTS

| | | | | | |
|---|---|---|---|---|---|
| 5,196,075 A | * | 3/1993 | Jansen et al. | ................ | 148/530 |
| 5,360,676 A | * | 11/1994 | Kuguminato et al. | ........ | 428/682 |
| 6,042,952 A | * | 3/2000 | Aratani et al. | .............. | 428/684 |

* cited by examiner

*Primary Examiner*—George Wyszomierski
(74) *Attorney, Agent, or Firm*—Anthony J. Casella; Gerald E. Hespos

(57) ABSTRACT

A hot worked steel material, such as a bar, or tube, has a surface layer improving its fatigue strength despite the non-metallic inclusions which it may contain, or the cracks which it may have. The surface layer is formed by heating a nickel layer on the steel surface to cause the diffusion of nickel therethrough.

5 Claims, No Drawings

STEEL MATERIAL OF HIGH FATIGUE STRENGTH AND A PROCESS FOR MANUFACTURING THE SAME

BACKGROUND OF THE INVENTION

1. Field of the Invention

This invention relates to a steel material of high fatigue strength in the form of a slab, or a like material prepared by continuous casting which can be hot worked to make a tube, round bar, sheet, etc., and a process for manufacturing the same.

2. Description of the Prior Art

A steel slab, or a like steel material prepared by continuous casting is usually used for making a tube, round bar, sheet, etc., but the removal of its skin by cutting, grinding or pickling for processing is likely to result in a product having non-metallic inclusions exposed on its steel surface or remaining in a layer immediately below its surface, or having small cracks remaining or formed in its surface. The non-metallic inclusions are mainly oxides, such as $Al_2O_3$ and CaO, having a very high degree of hardness and a very low degree of elongation as compared with steel. Most of the non-metallic inclusions and cracks have a maximum size of, say, 20 to 30 microns.

Those non-metallic 20–30 microns inclusions and cracks occurred on the surface of the steel or therein lower the fatigue strength of a steel tube, bar, sheet, etc. when a fatigue load has acted upon it in an environment causing its fatigue, since they concentrate a fatigue stress and start its fatigue failure. I, the inventor of this invention, have, however, found that the non-metallic inclusions are responsible for the fatigue failure of a steel material having no crack at all, or having only so small cracks as not to cause its fatigue failure. The fatigue failure test which I conducted on a steel material having a surface worked to leave only cracks as small as up to, say, 5 microns, gave a fracture showing non-metallic inclusions having a size of, say, 20 to 30 microns, and I have concluded that those inclusions caused the fatigue failure of the material. It is considered that a reduction caused by non-metallic inclusions to the fatigue strength of steel is due to an increased concentration of stress caused by a difference in hardness and elongation between the steel and non-metallic inclusions.

SUMMARY OF THE INVENTION

Under these circumstances, it is an object of this invention to provide a steel material having such a high fatigue strength as to withstand use in an environment by reducing the influence of the non-metallic inclusion on its surface, or surface layer as much as possible by means of hot working, such as forging, rolling or extrusion, or its skin removal and others.

It is another object of this invention to provide a process for manufacturing a steel material of high fatigue strength.

These objects are attained by a steel material having a layer of increased fatigue strength formed by diffusion under heat from a nickel plating layer on a surface formed by hot working, such as forging, rolling or extrusion, and skin removal, and containing non-metallic inclusions therein, or in a layer immediately thereunder, and by a process which comprises the steps of plating with nickel a surface in or under which steel contains non-metallic inclusions, and heating the nickel to cause it to diffuse into the steel surface to form a layer of increased fatigue strength.

DETAILED DESCRIPTION OF THE INVENTION

When a steel material prepared by hot working, such as forging, rolling or extrusion, has at least a part of its surface subjected to skin removal treatment as required for the manufacture of a final product, the non-metallic inclusions which it contains are exposed in its surface, or come to stay in a layer immediately thereunder. According to this invention, therefore, the surface in or under which the steel material contains such non-metallic inclusions is plated with a nickel layer, and the nickel layer is heated to cause the diffusion of nickel to form a surface layer of increased fatigue strength. The skin removal treatment may be carried out by any appropriate method, such as cutting, grinding, polishing, pickling, chemical polishing, electrolytic polishing or melting.

The layer of increased fatigue strength is higher in hardness and lower in elongation than steel, and as the non-metallic inclusions and the steel surface have a smaller difference in hardness and elongation, the steel surface has a lower degree of fatigue stress concentration and thereby an improved fatigue strength. The layer is not particularly limited in thickness, but preferably has a thickness of, say, 10 to 30 microns. It makes the steel material highly reliable for use even in an environment creating a large amount of fatigue stress.

The process of this invention can be carried out by using any existing equipment and thereby makes it possible to manufacture a steel material of high fatigue strength at a low cost.

The invention will now be described in further detail by a few specific examples.

EXAMPLE 1

A round bar of S45C steel (JIS) having a diameter of 15 mm was made by cutting and grinding a hot worked product of a continuously cast billet, and had its surface plated with a nickel layer formed by a customary electroplating method and having a thickness of 4 microns. Then, the bar was heated at a temperature of 1120° C. for four minutes in a heating furnace having an inert gas atmosphere, and was rapidly cooled, whereby a layer of increased fatigue strength having a thickness of about 20 microns was formed on the surface of the bar as a result of the diffusion of nickel therethrough.

A rotational bending fatigue test was conducted to compare the bar with a comparative round bar having the same size, but simply plated with nickel. While fatigue failure occurred to the comparative bar when the application of the load was repeated $4 \times 10^6$ times, no failure occurred at all to the bar according to this invention until the application of the load was repeated $1.2 \times 10^7$ times, despite the presence of non-metallic inclusions in and below its surface. This was apparently due to a reduction of the concentration of stress in the bar by the layer of increased fatigue strength. The examination of a fracture of the comparative bar revealed the presence of non-metallic inclusions in the area where its fatigue failure had started.

EXAMPLE 2

A round shaft of S45C steel having a diameter of 24 mm was made by cutting and grinding a hot forged material, and had its surface plated with a nickel layer formed by a customary electroplating method and having a thickness of 3 microns. Then, the shaft was heated at a temperature of 1200° C. for two minutes in a heating furnace having an inert gas atmosphere, and was rapidly cooled, whereby a layer of increased fatigue strength having a thickness of about 18 microns was formed on the surface of the shaft as a result of the diffusion of nickel therethrough.

A rotational bending fatigue test was conducted to compare the shaft with a comparative shaft having the same size, but simply plated with nickel. While fatigue failure occurred to the comparative shaft when the application of the load was repeated $4.7 \times 10^6$ times, no failure occurred at all to the shaft embodying this invention until the application of the load was repeated $1.2 \times 10^7$ times, despite the presence of non-metallic inclusions in and below its surface. This was considered due to a reduction of the concentration of stress in the shaft by the 18 microns layer of increased fatigue strength formed by Ni diffusion.

The examination of a fracture of the comparative shaft revealed the presence of non-metallic inclusions in the area where its fatigue failure had started, as had been the case with the comparative bar in Example 1.

EXAMPLE 3

A seamless steel tube having an outside diameter of 24 mm and an inside diameter of 10 mm was made by cutting and grinding the inner surface of a seamless tube of STS35 steel prepared by hot working, and had its inner surface plated with a nickel layer formed by a customary electroplating method and having a thickness of 3 microns. Then, the tube was heated at a temperature of 1130° C. for three minutes in a heating furnace having an inert gas atmosphere, and was rapidly cooled, whereby a layer of increased fatigue strength having a thickness of about 15 microns was formed on the inner surface of the tube as a result of the diffusion of nickel therethrough.

A hydraulic oil having a pressure varying in a sine wave between a base pressure of 150 bars and a peak pressure was introduced into the tube to determine the peak pressure indicating its fatigue limit or strength. The result is shown in Table 1 below. Table 1 also shows the results obtained from a comparative seamless steel tube (1) of the same size having cracks having a size of 20 to 30 microns in its inner surface simply plated with nickel, and another comparative seamless steel tube (2) of the same size having very small cracks having a size of, say, 5 to 6 microns in its inner surface simply plated with nickel.

As is obvious from Table 1, no fatigue failure occurred at all to the tube embodying this invention even though the application of a peak pressure of 1700 bars was repeated $10^7$ times, despite the presence of non-metallic inclusions in and below its inner surface, while a peak pressure of 1200 bars caused the failure of comparative tube 1 having cracks having a size of 20 to 30 microns in its inner surface, and a peak pressure of 1400 bars caused the failure of comparative tube 2 having very small cracks. The fatigue strength of the tube embodying this invention was considered due to a reduction of the concentration of stress in its wall by its 15 microns layer of increased fatigue strength formed by the Ni diffusion.

TABLE 1

| | | Crack size ($\mu$m) | Surface layer | Results Peak pressure (bars) | Failure |
|---|---|---|---|---|---|
| Invention | | 5–6 | Layer of increased fatigue strength having a thickness of about 15 $\mu$m | 1700 | No, despite the application of load repeated $10^7$ times |
| Comparative tube | 1 | 20–30 | Nickel plating | 1200 | Yes |
| | 2 | 5–6 | Nickel plating | 1400 | Yes |

What is claimed is:

1. A steel material having a steel base material hot worked by a skin removal treatment and containing non-metallic inclusions, a layer of nickel plated onto said steel base material and diffused into said steel base material by heating thus defining a surface layer comprising the steel base material, the non-metallic inclusions and the diffused nickel, the surface layer having a thickness of approximately 10–30 $\mu$m and having a fatigue strength higher than the steel material and the non-metallic inclusions prior to the plating and heating.

2. A process for manufacturing a steel material of higher fatigue strength than a steel base material which comprises the steps of:

providing a steel base material that has been hot worked by a skin removal treatment and containing non-metallic inclusions exposed in at least a part of its surface;

plating a surface of the hot worked steel base material with nickel; and heating said nickel-plated steel base material sufficiently to cause diffusion of said nickel to form a surface layer of increased fatigue strength, said surface layer having a thickness of approximately 10–30 $\mu$m.

3. A process as set forth in claim 2, wherein said hot worked material is a bar.

4. A process as set forth in claim 2, wherein said hot worked material is a tube.

5. A process as set forth in claim 2, wherein the heating is carried out at a temperature of at least approximately 1,120° C.

* * * * *